US008166027B2

(12) United States Patent
Giallanza

(10) Patent No.: US 8,166,027 B2
(45) Date of Patent: Apr. 24, 2012

(54) SYSTEM, METHOD AND PROGRAM TO TEST A WEB SITE

(75) Inventor: Salvatore J. Giallanza, Marana, AZ (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 11/393,976

(22) Filed: Mar. 30, 2006

(65) Prior Publication Data

US 2007/0239729 A1 Oct. 11, 2007

(51) Int. Cl.
*G06F 17/30* (2006.01)
(52) U.S. Cl. ...................................................... 707/726
(58) Field of Classification Search .................. None
See application file for complete search history.

(56) References Cited

U.S. PATENT DOCUMENTS

| 5,446,891 | A  | * | 8/1995 | Kaplan et al. ............... 707/2 |
| 6,012,052 | A  | * | 1/2000 | Altschuler et al. ............ 707/2 |
| 6,263,361 | B1 |   | 7/2001 | Hoyer et al. ............... 709/203 |
| 6,344,851 | B1 | * | 2/2002 | Roberts et al. ............. 345/418 |
| 6,421,724 | B1 |   | 7/2002 | Nickerson et al. .......... 709/224 |
| 6,549,896 | B1 | * | 4/2003 | Candan et al. ............... 707/2 |
| 6,704,727 | B1 | * | 3/2004 | Kravets ...................... 707/5 |
| 6,738,678 | B1 | * | 5/2004 | Bharat et al. ............... 700/48 |
| 6,754,873 | B1 | * | 6/2004 | Law et al. ................. 715/208 |
| 6,792,412 | B1 | * | 9/2004 | Sullivan et al. ............. 706/25 |
| 6,839,680 | B1 | * | 1/2005 | Liu et al. .................. 705/10 |

(Continued)

FOREIGN PATENT DOCUMENTS

JP  2002342381 A  * 11/2002

OTHER PUBLICATIONS

'Mini small worlds' of shortest link paths crossing domain boundaries in an academic Web space by Lennart Bjorneborn, International Conference on Scientometrics and Informetrics No10, Stockholm , SUEDE (Jul. 24. 2005) 2006, vol. 68, No. 3 (330 p.) [Document : 20 p.] (1 p. 1/2), pp. 395-414 [20 page(s) (article)].*

(Continued)

*Primary Examiner* — Bai D. Vu
(74) *Attorney, Agent, or Firm* — Yee & Associates, P.C.; Arthur J. Samodovitz

(57) ABSTRACT

Computer system, method and program product for testing a web site are disclosed. Numbers of hyperlinks required to navigate from one web page of the web site to other, respective web pages on the web site are determined. A score for ease of navigation though the web site based at least in part on the numbers is generated, such that lower numbers correlate to easier navigation through the web site. Another computer system, method and program product for testing a web site are disclosed. First keyword searches are conducted in the web site, using a search engine in the web site, based on sets of search terms ANDed together. Second keyword searches are conducted in the web site, using the search engine at the web site, based on respective subsets of the sets of search terms. Each subset is either a single term within the respective set or two or more terms within the respective set ANDed together. A score for effectiveness of the search engine is determined based at least in part on the frequency at which search results of the first keyword searches are contained in search results for the respective second keyword searches.

18 Claims, 3 Drawing Sheets

U.S. PATENT DOCUMENTS

| | | | |
|---|---|---|---|
| 7,203,899 B2 * | 4/2007 | Chi et al. | 715/205 |
| 7,254,607 B2 * | 8/2007 | Hubbard et al. | 709/203 |
| 7,502,994 B2 * | 3/2009 | Kocol | 715/205 |
| 2002/0072955 A1 * | 6/2002 | Brock | 705/10 |
| 2003/0001884 A1 * | 1/2003 | Liu | 345/738 |
| 2003/0126027 A1 * | 7/2003 | Nelson et al. | 705/26 |
| 2003/0149694 A1 * | 8/2003 | Ma et al. | 707/9 |
| 2003/0172349 A1 * | 9/2003 | Katayama et al. | 715/513 |
| 2004/0019688 A1 * | 1/2004 | Nickerson et al. | 709/229 |
| 2005/0114353 A1 | 5/2005 | Malik et al. | 707/10 |
| 2005/0125285 A1 * | 6/2005 | McQueeney et al. | 705/14 |
| 2005/0171779 A1 * | 8/2005 | Joublin | 704/270.1 |
| 2005/0198068 A1 * | 9/2005 | Mukherjee et al. | 707/104.1 |
| 2006/0074864 A1 * | 4/2006 | Naam et al. | 707/3 |
| 2006/0085447 A1 * | 4/2006 | D'Urso | 707/100 |
| 2006/0265670 A1 * | 11/2006 | Cohen et al. | 715/854 |
| 2007/0106758 A1 * | 5/2007 | Chi et al. | 709/219 |
| 2007/0130125 A1 * | 6/2007 | Holte | 707/3 |

OTHER PUBLICATIONS

Frommer and Pundoor "Small-Worlds: A Review of Recent Books", Published online 00 Month 2002 in Wiley InterScience. http://www-users.math.umd.edu/~orbit/Pubs/FrommerBookReview.pdf.*

* cited by examiner

SYSTEM, METHOD AND PROGRAM TO TEST A WEB SITE

FIELD OF THE INVENTION

The invention relates generally to computer systems and the World Wide Web, and more specifically to a program tool to test a web site.

BACKGROUND OF THE INVENTION

The World Wide Web is well known today and comprises a vast multitude of web servers forming web sites. Client computers with web browsers are connected to the web servers via communication media, Internet Service Providers, firewalls, routers, etc. Upon request by a client computer, a web site can furnish a "home page" or other web pages to the client computer. The web browser on the client computer displays the home page or other web page for the user to view and enter data or make selections. Some of the selections are links to navigate through web pages in the same web site or other web sites.

Some complex web sites offer a local search engine to search through the web site based on key words entered by the user. The user can use the search engine to locate a web page of interest to the user. For example, the user may want to locate and display a web page containing information of interest to the user or a web page used to purchase a product. Some search engines are more effective than others, i.e. faster, more user friendly and better able to locate the web page of interest to the user.

Some web sites provide "support" to customers in their use of various hardware or software products. For example, Microsoft Corporation provides a web site to provide support or help to customers of various Microsoft operating systems. Likewise, IBM provides a web site to provide support or help to customers of various IBM program products such as Tivoli Storage Manager ("TSM") web site and Lotus Notes web site. Many other software manufacturers also provide web sites for support or help to their customers.

An object of the present invention is to provide a program tool which automatically tests and determines usability of a web site.

Another object of the present invention is to provide a program tool which automatically tests and determines usability of a web site providing customer support or help for a manufacturer's hardware or software products.

SUMMARY OF THE INVENTION

The present invention resides in a computer system, method and program product for testing a web site. Numbers of hyperlinks required to navigate from one web page of the web site to other, respective web pages on the web site are determined. A score for ease of navigation though the web site based at least in part on the numbers is generated, such that lower numbers correlate to easier navigation through the web site.

According to features of the present invention, the one web page is a home page for the web site. The other web pages include questionnaires for a user to provide feedback about the other web pages, respectively.

The present invention also resides in another computer system, method and program product for testing a web site. First keyword searches are conducted in the web site, using a search engine in the web site, based on sets of search terms ANDed together. Second keyword searches are conducted in the web site, using the search engine at the web site, based on respective subsets of the sets of search terms. Each subset is either a single term within the respective set or two or more terms within the respective set ANDed together. A score for effectiveness of the search engine is determined based at least in part on the frequency at which search results of the first keyword searches are contained in search results for the respective second keyword searches.

According to features of the present invention, third keyword searches are conducted in the web site, using the search engine in the web site, based on predefined search terms suited for a type of the web site. A frequency at which the search engine identifies one or more hyperlinks complying with the third keyword searches is determined. A score for content of the web site based at least in part on the frequency at which the search engine identifies one or more hyperlinks complying with the third keyword searches is determined.

DETAILED DESCRIPTION OF THE PREFERRED EMBODIMENTS

Figure 1:
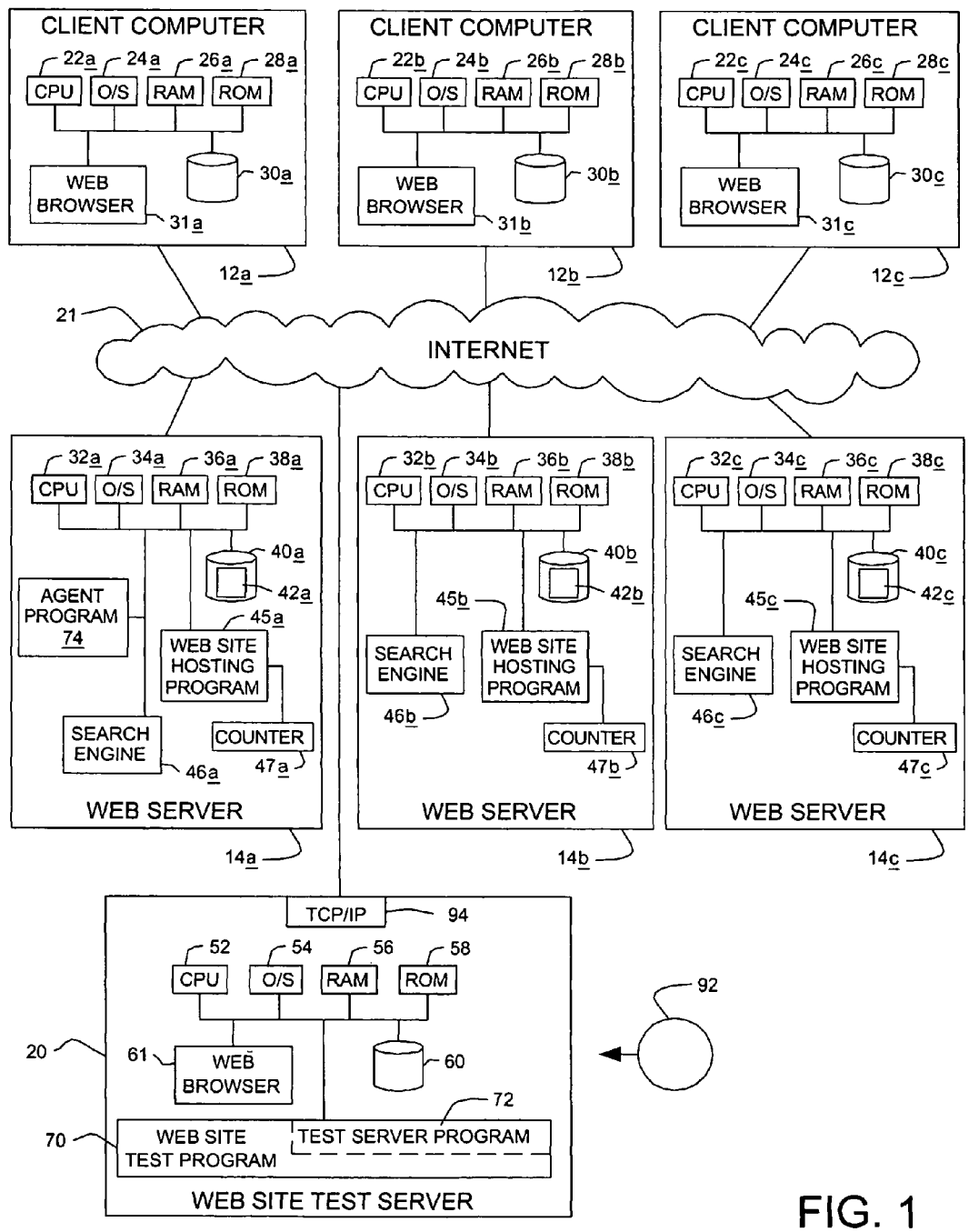
FIG. 1 is a block diagram of a distributed computer system, including a web site test program tool which embodies the present invention.

The present invention will now be described in detail with reference to the figures. FIG. 1 illustrates a distributed computer system 10 generally comprising client computers 12a,b,c, web servers 14a,b,c, and a web site test server 20, all interconnected via internet 21. Each of the client computers 12a,b,c includes known CPU 22a,b,c, operating system 24a,b,c, RAM 26a,b,c, ROM 28a,b,c, storage 30a,b,c and web browser 31a,b,c, respectively. Each of the web servers 14a,b,c includes known CPU 32a,b,c, operating system 34a,b,c, RAM 36a,b,c, ROM 38a,b,c and storage 40a,b,c, respectively. Each of the web servers 14a,b,c also includes web site hosting program 45a,b,c and database 42a,b,c of web pages and web files forming respective web sites. Each of the web pages is stored in HTML or other markup language, and each of the web files is stored in HTML or other format. Each of the web servers 14a,b,c also includes a respective counter program 47a,b,c to count the number of client requests to access each web page. By way of example, the web sites provide customer support or help for hardware and/or software products sold or licensed by the owners of the respective web sites. Many of the web pages in each web site provide a respective questionnaire (in pop-up or other format) to users of the respective web page, to elicit feedback from the users. (The questionnaires for the respective web pages also reside in databases 42a,b,c.) For example, after a customer uses a web page, a Java applet embedded in the web page, will create a pop-up questionnaire to ask the customer how usable was the web page, how easily was the web page found, and how effective was the web page, and for customer comments. Counter programs 47a,b,c also count the number of client responses to feedback questionnaires for each web page. Thus, for each web page, counter programs 47a,b,c count the number of client accesses and number of client feedbacks. Both counts represent a level of user interest in each web page.

Each of the web servers 14a,b,c also includes a respective keyword search engine 46a,b,c to search through the respective web sites for web pages and web files of interest to the user. Web site test server 20 also includes known CPU 52, operating system 54, RAM 56, ROM 58, storage 60 and web browser 61 (preferably enabled for Sun Microsystems Java program). Web site test server 20 also has known, high-speed Internet access such as DSL or cable, so its measurements of the web site are not affected by its own speed of access to the Internet 21 and web servers 14a,b,c. Web site test server 20 also includes a web site test program 70 according to the present invention. As explained in more detail below, program 70 automatically tests various characteristics of web sites such as content and organization of web pages and hyperlinks within the web pages and also presence and effectiveness of their local search engine 46a,b,c to determine the usability of the web site. More specifically, program 70 tests and determines how easily customers can navigate to web pages of interest, i.e. how many web pages must be traversed via respective hyperlinks to navigate from the home page to the web page of interest. Program 70 also tests and determines whether the local search engine of each web server 14a,b,c responds well to both one and two word searches, there is sufficient breadth to the searches and there is sufficient content of the searches. These are all indicia of the effectiveness of the local search engine.

Figure 2:
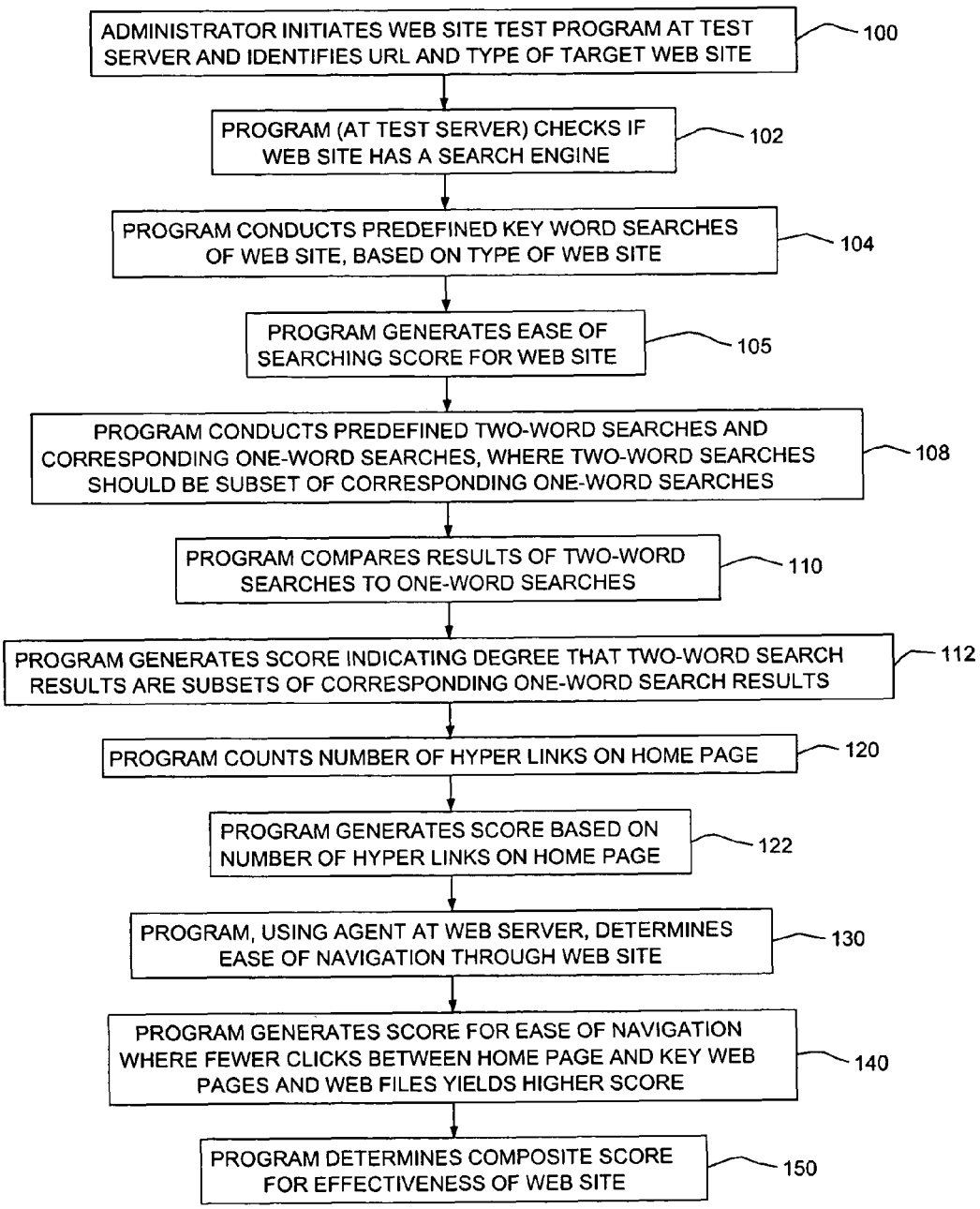
FIG. 2 is a flow chart of the web site test program tool of FIG. 1.

FIG. 2 illustrates the operation and function of web site test program 70 in more detail. The following explanation of program 70 is for testing a single web site on a single server, but will be repeated for each other web site on the same or different server. By way of example, program 70 includes a test server portion 72 that executes in test server 20 and an agent program 74 which can be written in Sun Microsystems Java language and executes at the web server 14a,b,c under test. In step 100, a user initiates program 70 and specifies a URL of a home page of a web site to be tested. In response, program 72 sends its agent program 74 to the web site 14a,b,c under test. First, program 72 checks if the web site 14a,b,c has a knowledge base utilizing a site search (step 102). Next, program 72 conducts a number of predefined searches using the search engine at the web site 14a,b,c based on predefined search queries and checks and records the time it takes to receive a response (step 104). If there is no web page at the web site 14a,b,c that complies with the search query, this is noted as well. By way of example, the predefined search queries comprise search terms typically found on a web page for each type of web site. An administrator previously defined these search queries for each type of web site to be tested. At the start of the test, the user specified the type of web site currently under test, so program 72 knows which search queries to conduct. In step 105, program 70 generates a score for the test of step 104, where a response to all search queries (with at least one hyper link for a web page which complies with the search query) in the shortest period of time receives the highest score, and either a slow response or no response with a hyper link for a web page that complies with the search query results in a lower score.

Next, program 70, using web browser 61, initiates a series of predefined one-word and two-word, keyword searches of the web site (step 108). Preferably, each of the two-word searches includes one of the one-word search terms ANDed with another search term. For example, if some of the one-word search terms are database, volume, fixpack, then the corresponding two-word search terms can be database and restore, volume and dismount, and fixpack and interim, respectively. Program 72 identifies the key words for these searches from a file (previously defined by an administrator) where the one-word and two-word search terms are classified by type of web site. As noted above, when initiating program 70, the user specified the type of web site. Program 72 then compares the results (i.e. web page hyperlinks) of the one-word versus two-word searches as follows (step 110). If the search engine is working properly, each "hit" or result (i.e. web page hyper link) of a two-word search should be a subset of the "hits" or results (i.e. web page hyper link) of the corresponding one-word search, because the two-word search includes the one-word and the words of the two-word search are ANDed together. So, program 70 determines if each of the top ten (or other predetermined number) of hits of the two-word search are found in the hits of the corresponding one-word search. Next, program 70 generates a score for this comparison based on the number of hits of the two-word search that are found in the hits of the one-word search (step 112). The higher the number of hits of the two-word search that are found in the hits of the one-word search the higher the score.

Next, program 70 measures the ease of navigation though the web site as follows. Agent program 74 fetches the home page for the web site and counts the number of hyperlinks on the home page (step 120). (The hyperlinks are clickable representations of URLs of other web pages or web files, and can easily be counted from the corresponding HTML.) This is one indicia of ease of navigation through the web site because the hyperlinks on the home page facilitate access to other web pages or web files on the web site. Next, program 70 generates a score based on the number of hyperlinks of the home page, the greater the number of hyperlinks on the home page generally the easier to navigate intelligently through the web site (step 122). Next, program 70 measures the ease in accessing, via the home page, the other web pages or web files on the web site (step 130). This measurement is based on the number "clicks" or hyperlinks required to navigate to other, key web pages or web files from the home page. In this regard, each web site can be viewed as hierarchical, with each hyper link and respective web page being a node in the hierarchy. The home page is the highest node in the hierarchy. So, for a user to "navigate" from the home page to another web page requires traversal through the intervening hyperlinks and respective web pages. Ideally, each web page in the web site should be reachable from the home page with a minimum number of intervening hyperlinks. Accordingly, program 70 generates an ease of access score based on the shortest number of intervening hyperlinks to navigate from the home page to the key web pages or web files on the web site (step 140). The key web pages or web files can be (a) the web pages or web files that are most frequently accessed by users, (b) all web pages or web files at the web site, (c) web pages or web files previously designated by an administrator as key, or (d) those web pages or web files which receive the greatest number of feedback responses, i.e. those web pages or web files for which the greatest numbers of users have responded to a corresponding feedback questionnaire (such as a pop-up questionnaire for the respective web page or web file).

Figure 3:
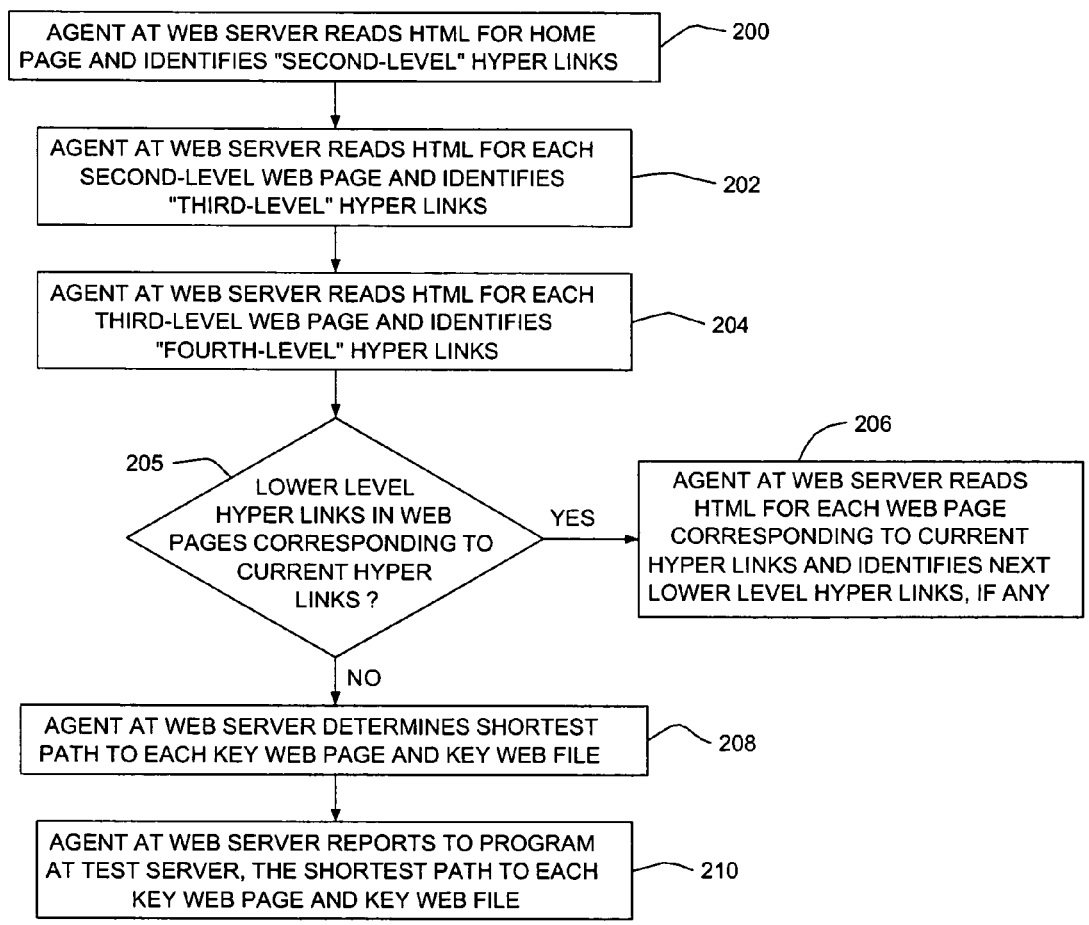
FIG. 3 is a more detailed flow chart of part of the web site test program of FIG. 2 which determines a minimum number of intervening hyperlinks to navigate from a home page to each key web page or web file of the web site.

FIG. 3 illustrates step 140 in more detail, where program 70 determines the minimum number of intervening hyperlinks to navigate from the home page to each of the key web pages or web files. The agent program 74 at the web server reads the HTML for the home page (i.e. the first or highest level node in the hierarchy), and identifies each of the hyperlinks on the home page and respective web pages and web files (i.e. the second level nodes in the hierarchy) on the home page (step 200). Then, for each of the second level web pages, the agent program at the web server reads the corresponding HTML, and identifies each of the hyperlinks and respective web pages and web files (i.e. the third level nodes in the hierarchy) (step 202). Then, for each of the third level web pages, the agent program at the web server reads the corresponding HTML, and identifies each of the hyperlinks and respective web pages and web files (i.e. the fourth level nodes in the hierarchy) (step 204). The agent program 74 continues the foregoing process until all of the key web pages or web files have been identified in the hierarchy (decision 205 and step 206). (In the case where the "key" web pages or web files are all the web pages or web files on the web site, agent program 74 determines when all web pages or web files have been identified in the hierarchy by unique URLs.) Next, agent program 74 determines the shortest node-to-node path to each key web page or web file at the web site (step 208). The shortest node-to-node path is the path with the fewest intervening hyperlinks between the home page and the key web page or web file. Next, the agent program 74 reports back to program 72 the shortest node-to-node paths in the hierarchy from the home page to each key web page or web file (step 210).

Referring again to FIG. 2, next, program 70 determines a composite score for the web site, based on the separate scores generated in steps 105, 112, 122 and 140 (step 150). The composite score can be the summation of the separate scores, with appropriate weight, such as the following.

A×(ease of searching score)+B×(degree of two-word subset score)+C×(number of hyper links on home page score)+D×(ease of navigation score)=web site effectiveness score, where A, B, C and D are weighting constants.

Program 70 can be loaded into test server 20 from a computer readable media 92 such as magnetic disk or tape, optical disk, DVD, memory stick, etc. or downloaded from the Internet via TCP/IP card 94.

Based on the foregoing, system, method and program for testing a web site have been disclosed. However, numerous modifications and substitutions can be made without deviating from the scope of the present invention. Therefore, the present invention has been disclosed by way of example and not limitation, and reference should be made to the following claims to determine the scope of the present invention.

What is claimed is:

1. A method for testing a web site, said method comprising the steps of:
   a website test server for testing a web site;
   said web site test server being programmed to identify web pages of the web site that include a first web page, a second web page, and other web pages, the second web page being a web page which has received a greatest number of feedback responses from previous users of the web site;
   said web site test server being further programmed to measure an ease of navigation from the first web page to the second web page by counting hyperlinks on the first web page and determining how many intervening hyperlinks are required to navigate between the first web page and the second web page;
   said web site test server being further programmed to determine a shortest number of the intervening hyperlinks required to navigate from the first web page of the web site to the second web page of the web site, wherein the shortest number of intervening hyperlinks is determined by: reading HTML of the first web page, identifying each hyperlink on the first web page, reading HTML of the web pages associated with each hyperlink and identifying further hyperlinks until reaching the second web page; and
   said website test server generates a score for ease of navigation though said web site based at least in part on said shortest number, such that a lower number correlates to easier navigation through said web site.

2. The method as set forth in claim 1 wherein said first web page is a home page for said web site.

3. The method as set forth in claim 1 wherein said second web page and said other web pages include questionnaires for a user and the previous users to provide feedback about said other web pages, respectively.

4. The method as set forth in claim 3 further comprising the step of displaying said questionnaires in pop-up windows associated with said second web page and said other web pages.

5. The method as set forth in claim 1 wherein the first web page is a home page, and wherein the step of generating said score is also based in part on the number of hyperlinks on said home page.

6. The method as set forth in claim 1 further comprising the steps of:
   conducting first keyword searches in said web site, using a search engine in said web site, based on sets of search terms ANDed together;
   conducting second keyword searches in said web site, using said search engine at said web site, based on respective subsets of said sets of search terms, wherein each subset is either a single term within the respective set or two or more terms within the respective set ANDed together; and
   determining a score for effectiveness of said search engine based at least in part on the frequency at which search results of said first keyword searches are contained in search results for the respective second keyword searches.

7. The method as set forth in claim 6 further comprising the steps of:
   conducting third keyword searches in said web site, using said search engine in said web site, based on predefined search terms suited for a type of said web site;
   determining a frequency at which said search engine identifies one or more hyperlinks complying with said third keyword searches; and
   determining a score for content of said web site based at least in part on the frequency at which said search engine identifies one or more hyperlinks complying with said third keyword searches.

8. The method as set forth in claim 7, further comprising weighing one or more of the score for ease of navigation, the score for effectiveness, and the score for content.

9. The method set forth in claim 8, further comprising summing one or more of the score for ease of navigation, the score for effectiveness, and the score for content.

10. The method of claim 1, further comprising:
    sending an agent program to the web site under test;
    conducting a number of predefined searches based on at least one predefined search query; and
    recording a time for receiving a response from the number of predefined searches.

11. A computer program product having computer executable code tangibly embodied on a computer readable storage medium, the computer program product configured to test a web site, said computer program product comprising:
    a computer readable media;

first program instructions to identify web pages of the web site that include a first web page, a second web page, and other web pages, the second web page being a web page which has received a greatest number of feedback responses from previous users of the web site second program instructions to measure an ease of navigation from the first web page to the second web page by counting hyperlinks on the first web page and determining how many intervening hyperlinks are required to navigate between the first web page and the second web page;

third program instructions to determine a shortest number of intervening hyperlinks required to navigate from the first web page of the web site to the second web page of the web site, wherein the shortest number of intervening hyperlinks is determined by: reading HTML of the first web page, identifying each hyperlink on the first web page, and iteratively reading HTML of the web pages associated with each hyperlink and identifying further hyperlinks until reaching the second web page; and fourth program instructions to generate a score for ease of navigation though said web site based at least in part on said shortest number, such that a lower number correlates to easier navigation through said web site; and wherein said first, second, third and fourth program instructions are stored on said media.

12. The computer program product as set forth in claim 11 wherein said first web page is a home page for said web site.

13. The computer program product as set forth in claim 11 wherein said second web page and said other web pages include questionnaires for a user and the previous users to provide feedback about said other web pages, respectively.

14. The computer program product as set forth in claim 13 further comprising fifth program instructions to initiate display of said questionnaires in pop-up windows associated with said second web page and said other web pages.

15. The computer program product as set forth in claim 11 wherein the first web page is a home page, and wherein said second program instructions generate said score based in part on the number of hyperlinks on said home page.

16. The computer program product as set forth in claim 11 further comprising:

fifth program instructions to conduct first keyword searches in said web site, using a search engine in said web site, based on sets of search terms ANDed together;

sixth program instructions to conduct second keyword searches in said web site, using said search engine at said web site, based on respective subsets of said sets of search terms, wherein each subset is either a single term within the respective set or two or more terms within the respective set ANDed together; and seventh program instructions to determine a score for effectiveness of said search engine based at least in part on the frequency at which search results of said first keyword searches are contained in search results for the respective second keyword searches; and wherein said fifth, sixth and seventh program instructions are stored on said media in functional form.

17. The computer program product as set forth in claim 16 further comprising:

eighth program instructions to conduct third keyword searches in said web site, using said search engine in said web site, based on predefined search terms suited for a type of said web site;

ninth program instructions to determine a frequency at which said search engine identifies one or more hyperlinks complying with said third keyword searches; and tenth program instructions to determine a score for content of said web site based at least in part on the frequency at which said search engine identifies one or more hyperlinks complying with said third keyword searches; and wherein said eighth, ninth and tenth program instructions are stored on said media in functional form.

18. A method for testing a web site, said method comprising the steps of:

a website test server for testing a web site;

said web site test server being programmed to check if the web site has a search engine;

said web site test server being programmed to conduct predefined keyword searches of the web site and to compare results of two-word searches with one-word searches;

said web site test server being programmed to identify web pages of the web site that include a home page, a second web page, and other web pages, the second web page being a web page which has received a greatest number of feedback responses from previous users of the web site and based on pop-up questionnaires for the web pages of the web site;

said web site test server being further programmed to measure an ease of navigation from the home page to the second web page by counting hyperlinks on the home page and determining how many intervening hyperlinks are required to navigate between the home page and the second web page; and said web site test server being further programmed to determine a shortest number of the intervening hyperlinks required to navigate from the home page to the second web page and to generates a score for ease of navigation though said web site based on said shortest number.

* * * * *